United States Patent [19]

Fitzsimmons et al.

[11] 4,317,067
[45] Feb. 23, 1982

[54] DIELECTRIC SURFACE ELECTRICAL DISCHARGE DEVICE

[76] Inventors: William A. Fitzsimmons; Louis A. Rosocha, both of P.O. Box 5321, Madison, Wis. 53705

[21] Appl. No.: 139,288

[22] Filed: Apr. 11, 1980

[51] Int. Cl.³ .................. H01S 3/091; H05B 41/02
[52] U.S. Cl. .................... 315/150; 250/493; 313/204; 372/85
[58] Field of Search ............ 315/150, 326; 313/204, 313/210, 231.6; 250/324, 493, 532; 331/94.5 G, 94.5 P

[56] References Cited

U.S. PATENT DOCUMENTS

| | | | |
|---|---|---|---|
| 3,688,151 | 8/1972 | Jansen et al. | 313/348 |
| 3,743,881 | 7/1973 | Blaszuk | 331/94.5 P X |
| 4,104,693 | 8/1978 | Toda et al. | 313/218 X |
| 4,114,113 | 9/1978 | Hasson et al. | 331/94.5 G |

*Primary Examiner*—Eugene R. La Roche
*Attorney, Agent, or Firm*—Isaksen, Lathrop, Esch, Hart & Clark

[57] ABSTRACT

A discharge device (10) is disclosed which is capable of providing preionizing ultraviolet wave length photons to the area of a gap between the first (15) and second (35) electrodes of the device. The first electrode (15) includes a core (20) of dielectric material, a conductive plate (23) mounted on one surface of the core, and a conductive grid (26) mounted on an opposed surface of the core which faces the second electrode. The application of a negative voltage pulse to the grid (26), while the plate (23) is maintained at substantially ground potential, causes electrons to discharge between the conductors of the grid and the adjacent surface of the dielectric core, and, in doing so, generates photons having wavelengths in the ultraviolet range. The ultraviolet photons, which are emanated in a two dimensionally uniform pattern over the surface of the dielectric core adjacent the grid, cause ionization of the gas within the main discharge gap between the first and second electrodes. The second electrode may be maintained at ground or other potential higher than the grid such that a sufficient potential difference reached between the second electrode and the grid after the preionization will result in a uniform glow discharge of electrons between the two electrodes. This glow discharge is useful for the firing of gas lasers and in certain chemical reactors, such as ozone generators.

18 Claims, 6 Drawing Figures

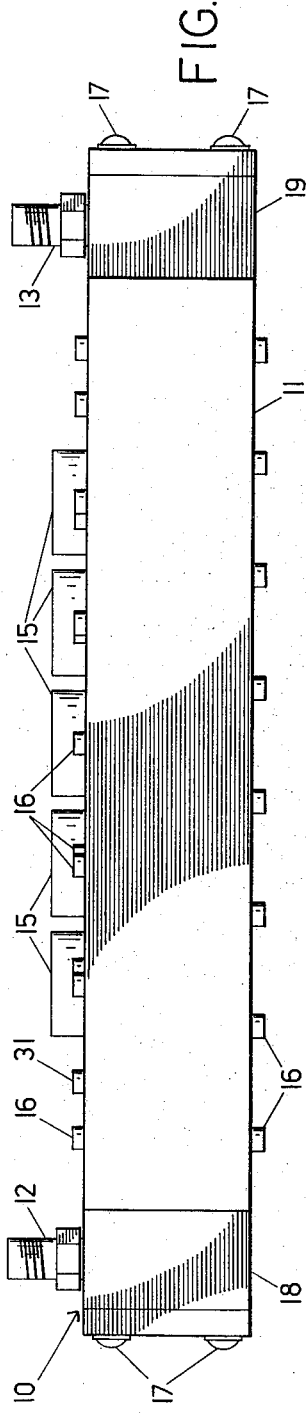
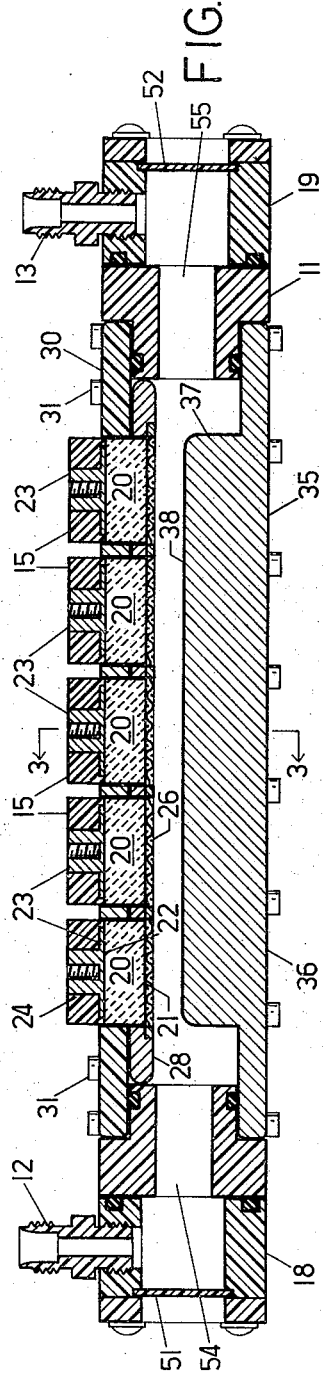
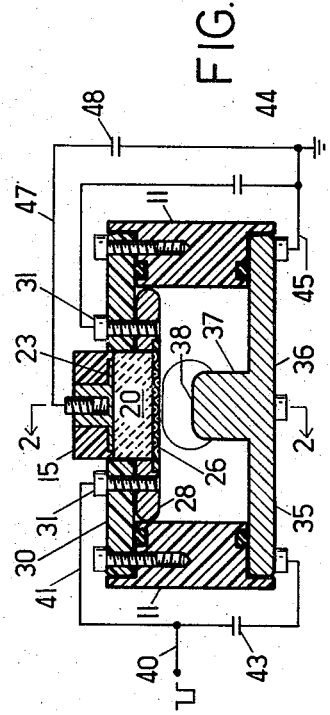
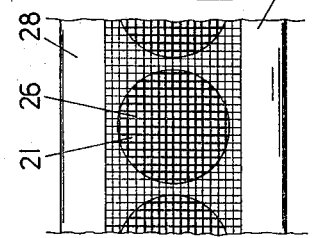

DIELECTRIC SURFACE ELECTRICAL DISCHARGE DEVICE

TECHNICAL FIELD

This invention pertains generally to the field of electrical discharge generators and particularly to such generators used to provide pulsed discharges to high pressure gas lasers and electrical discharge chemical reactors.

BACKGROUND ART

Self-sustained electrical discharges are utilized to excite high pressure gas lasers and to generate an ionized plasma for certain types of chemical reactors. It has been found that glow discharges that are stabilized against arcing and have a homogeneous volume distribution perform more efficiently in the excitation of lasers and in various other electrical discharge applications. A variety of techniques have been utilized to provide an initial discharge gap ionization which will allow initiation of a uniform glow discharge, including photoionization of gas molecules in the main discharge gap by ultraviolet light, photoelectron ejection from the cathode material by ultraviolet light, or direct injection of free electrons from an area outside the discharge gap. Typically, devices which provide preionization in the foregoing ways utilize a preionizer supplied by a separate energy delivery circuit, which is fired to provide the ionizing photons or electrons to the main discharge gap before the main pulse is applied across the gap.

In present preionizer structures, the ultraviolet light is usually derived from the production of bare sparks near or adjacent to the main discharge volume. Producing these intense sparks usually requires a substantial expenditure of energy and frequently results in the contamination of the main discharge gap volume by chemical products associated with the sparks themselves, or with the heating of the adjacent supporting structures by the sparks.

In addition to their utility in pulsing lasers, electrical discharges are also employed in some types of chemical reactors such as ozone generators. Ozone generators typically utilize a pair of spaced electrodes which extend linearly in an enclosure through which air is passed. Application of a high voltage between the electrodes of the ozone generator usually results in a linear array of sparks rather than a uniform glow discharge. Over a period of time, the sparks tend to pit and damage the electrodes, and the quantity of ozone produced per energy applied by spark discharges is generally less than can be obtained with uniform glow discharges.

DISCLOSURE OF THE INVENTION

The discharge device of the present invention utilizes a unique electrode which is capable of providing ionizing photons to a discharge gap which are distributed uniformly over the area of the electrode. A single electrical pulse provided to the electrode can be used to generate the ionizing photons as well as to fire the main discharge between the electrode and a second electrode spaced across the discharge gap. The ionizing electrode is formed of a solid core of dielectric material having a peripheral surface, with a conductive plate being mounted on one portion of the core surface and a conductive grid mounted on another portion of the core surface, with the grid and plate being spaced and electrically isolated from one another. The conductors of the grid are very close to or in contact with the surface of the dielectric core but leave areas of the surface exposed between the conductors.

The device also includes a second electrode spaced away from the aforementioned first electrode to define the main discharge gap, and a charging circuit which delivers short pulses of voltage between the two electrodes. In a preferred embodiment, the charging circuit delivers a very high negative voltage pulse directly to the conductive grid on the first electrode, acting as a cathode, and through an energy storage capacitor to the second electrode, which thus acts as an anode. The conductive plate on the dielectric core is connected through a coupling capacitor to ground. Application of the high voltage negative pulse to the grid results in a rapid initial build-up of negative voltage on the grid which produces an electric field between the surface of the dielectric core and the adjacent grid conductors. This electric field quickly reaches an intensity sufficient to initiate an electrical discharge between the grid and the dielectric core surface. The electrons moving across the dielectric surface generate photons in the ultraviolet frequency range which are uniformly emanated from the areas of the dielectric surface between the grid conductors. The photons passing into the discharge gap ionize the gas molecules in the gap, with the density of the ionization being substantially uniform over the area of any surface lying above and parallel to the grid. The density of ionization falls off over the distance from the first to the second electrode.

Because the first electrode grid and the second electrode are connected by an energy storage capacitor, the voltage across them builds up relatively gradually as this capacitor charges. The preionization discharge between the grid and the dielectric surface occurs at a charging voltage substantially less than that required to electrically break down the gap between the grid and the second electrode. Because of the small gap distance between the grid conductors and the adjacent dielectric surface, only a relatively small amount of energy is consumed by the preionization discharge. The voltage across the energy storage capacitor continues to increase after the preionizing discharge and eventually reaches a voltage sufficient to initiate and maintain a uniform glow discharge across the gap. The preionization of the gas in the gap facilitates the uniform emission of electrons from the areas of the dielectric core surface between the grid conductors, with no local formation of sparks. After termination of the charging pulse, the emission of electrons continues as the energy storage capacitor discharges until the voltage across the gap is no longer sufficient to support the discharge.

The functioning of the first and second electrodes as cathode and anode, respectively, can be reversed by applying a positive voltage pulse to the grid; and an ultraviolet photon generating discharge is again observed to occur between the grid and the dielectric surface. The main discharge flows from the second electrode to the first in a uniform emission, as a result of the preionization of the gap.

It is preferred that the material forming the dielectric core have a high dielectric constant so that a very high electric field can be imposed on the surface of the dielectric adjacent the grid at reasonable potentials between the conductive grid and the opposed plate. The material of which the dielectric core is formed is selected, and the spacing between the faces of the core is sized, such that a potential difference can be applied between the grid and the surface of the dielectric which initiates a discharge between these surfaces without breakdown of the insulating ability of the dielectric core material, and without the need for external heating of the electrode to stimulate electron emission. Materials having very high dielectric constants are thus preferred since high field intensities can be obtained at the surface of a relatively thick dielectric core which is thus resistent to electrical breakdown.

The dielectric core can be formed in various geometries. For example, the core can have opposed, flat, parallel faces on which the grid and plate are mounted; or, the grid and plate can be mounted on opposed portions of a curved surfaced core, such as a cylinder.

The ionizing electrode structure of the invention can be advantageously utilized for various purposes, including the firing of gas lasers or the production of ozone. For the latter application, a sealed enclosure is utilized in which air or oxygen is injected at one end of the enclosure and withdrawn at the other, the ionizing electrode of the invention being mounted along the length of the enclosure with a suitable anode spaced from it within the enclosure. It has been found that a uniformly preionized gap, as is obtained with the utilization of the present invention, facilitates a uniform electrical discharge which is highly advantageous in the production of ozone, since it allows the ozone to be formed at much higher gas concentrations, and allows higher rates of gas pass-through to be utilized. A uniform glow discharge may produce 40% or more ozone per unit energy than a non-uniform or spark discharge.

Further objects, features and advantages of the invention will be apparent from the following detailed description taken in conjunction with the accompanying drawings.

BRIEF DESCRIPTION OF THE DRAWINGS

In the drawings:

FIG. 1 is an external side elevation view of a dielectric discharge device in accordance with the invention.

FIG. 2 is a cross-sectional view of the device of FIG. 1 as taken along the section lines shown generally at 2—2 in FIG. 3.

FIG. 3 is a cross-sectional view of the device of FIG. 1 taken generally along the lines 3—3 of FIG. 2.

FIG. 4 is an internal view of the device showing a portion of the surface of the first electrode.

BEST MODE FOR CARRYING OUT THE INVENTION

Figure 5:
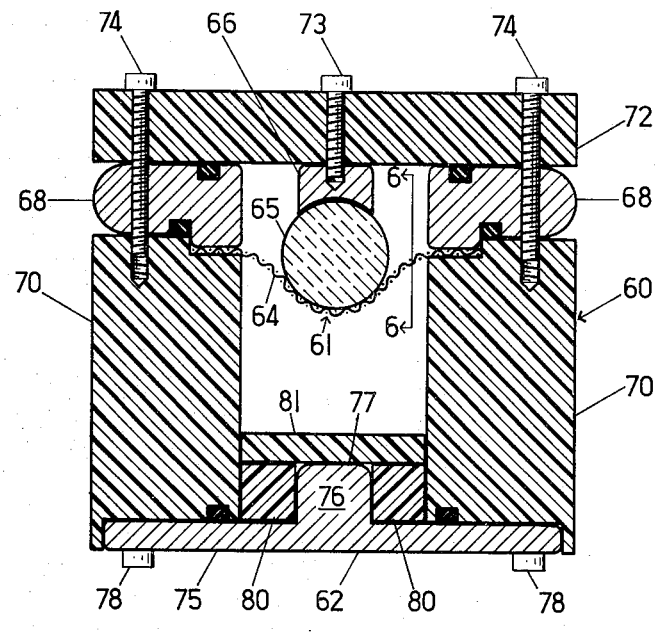
FIG. 5 is a cross-sectional view of another embodiment of the device.

With reference to the drawings, a preferred embodiment of a dielectric discharge device suitable for use with gas fired lasers or as an ozone generator is shown generally at 10 in FIG. 1. The device 10 has a generally rectangular insulating enclosure 11, a gas input port 12, and a gas exhaust port 13. The top ends of several electrode structures 15 which together form a first electrode are also shown in FIG. 1, as well as screws 16 and 17 which are used to assemble the enclosure 11. End housings 18 and 19 are mounted by the screws 17 to close off the ends of the enclosure and seal the interior of the enclosure from the surrounding atmosphere.

The internal construction of the device 10 is best shown with reference to the cross-sectional views of FIGS. 2 and 3. Each of the electrode structures 15 has a central core of dielectric material 20 which has one flat and preferably smooth surface 21 and a second opposed surface 22 substantially parallel therewith, on which a conductive plate 23 is mounted. The plate 23 is adapted to be connected by an external conductor to a charging circuit. The conductive plates 23 in each of the structures 15 are shown potted in an insulating compound 24. A conductive wire grid 26 is mounted on the flat surface 21 of each of the dielectric cores and extends across the face of all of the electrode structures 15 and into electrical contact with a conductive metal flange 28 which surrounds the individual structures 15. The flange 28 is mounted to an insulating panel 30, which forms part of the enclosure 11, by electrically conductive mounting screws 31. These screws also provide a means to electrically connect the flange 28 and the grid 26 to an external conductor.

The device 10 also includes a second electrode 35 composed of a conductor such as copper or aluminum which has a flat bottom plate portion 36 forming one of the walls of the enclosure. The second electrode also has a raised central portion 37 having a flat top surface 38 defining the conductive discharge surface of the electrode. The gap between the surface 38 of the electrode 35 and the grid 26, which defines the conductive surface of the first electrode, will typically be in the range of $\frac{1}{2}$ to $1\frac{1}{2}$ centimeters. Interior walls of the enclosure surround the discharge gap and electrically insulate the first and second electrodes from one another.

The surface of the first electrode is shown in the view of FIG. 4. The woven mesh of fine metallic conductors (such as copper or aluminum wires) of the grid 26 is surrounded by and in electrical contact with the conductive metal flange 28 and lies over the surface 21 of each dielectric core 20. Between each of the dielectric cores, the wires of the grid 26 may be potted in a stabilizing material to hold the conductors firmly over the dielectric and preferably in intimate contact with the surface of the dielectric. The areas of the surface 21 of the dielectric core between the conductive wires (e.g., 1 mm$^2$ squares) are left exposed.

The dielectric core is preferably formed of a material that is a good insulator, can withstand high temperatures, and has a very high dielectric constant. For example, barium titanate has performed satisfactorily as the core material. A core of barium titante can be made quite thick—for example, 1 centimeter or greater spacing between the opposed surfaces 21 and 22—while still providing a very high electric field intensity at the surface 21 of the dielectric when a potential difference is applied between the plate 23 and the grid 26. Other dielectric materials with smaller dielectric constants, such as glass, porcelain or ceramic, may be used for the dielectric core, but the spacing between the surfaces 21 and 22 will ordinarily have to be made correspondingly smaller in order to provide sufficient electric field intensity at the surface 21 of the dielectric. In general, the thinner the dielectric material, the lower the voltage at which insulation breakdown will occur. Thus, the material and thickness of the dielectric core is selected such that, for a chosen operating voltage, adequate field intensity will be obtained to initiate the preionizing discharge between the grid and the dielectric surface 21 without electrical breakdown of the dielectric core. Because of the local heating generated by the discharges, the dielectric should be resistant to relatively high temperatures.

An exemplary charging circuit is shown schematically in FIG. 3. A voltage pulse having relatively high amplitude and short duration is provided from a pulse generator onto a conductor 40; the pulse generator (not shown) may be of any type which is capable of providing the desired high amplitude voltage pulses. The voltage on the line 40 is transmitted through a conductor 41 to the screws 31, and thence to the flange 28 and the grid 26, such that the portions of the grids on each dielectric core 20 are essentially electrically connected in parallel. The conductor 40 is also connected through an energy storage capacitor 43 to the plate portion 36 of the second electrode 35. A second energy storage capacitor 44 (to provide additional capacitance, if needed) may also be connected in a similar manner between the grid 26 and the electrode 35 in electrical parallel with the capacitor 43. The electrode 35 is connected through a conductor 45 directly to ground. The plates 23 are shown in the views of FIGS. 2 and 3 as having an internally threaded bore which is adapted to have a conductor 47 threadingly inserted therein; this conductor 47 connects each of the plates 23 in electrical parallel through a coupling capacitor 48 to ground.

The generation of photons from the surface of the dielectric 21 will be described in detail below for an exemplary configuration in which the dielectric material is barium titanate, the supply voltage pulse has a negative amplitude of approximately 15,000 volts with a duration of 30-40 nanoseconds, and the main discharge gap is 1 centimeter. Since a negative voltage is applied to the grid 26, the structures 15 forming the first electrode act as a cathode and the second electrode 35 acts as an anode: electrons will discharge across the gap from the first to second electrodes. If a positive voltage pulse is applied to the grid, the electron flow will be reversed. The capacitance values of the capacitors 43, 44, and 48 are selected to provide desired charging pulse rise and decay times, and their preferred numerical capacitance values depend on the spacing of the gap, the material of the dielectric, the area of the anode and cathode, source resistance of the voltage supply, etc. It is noted that voltage pulses having magnitudes of several thousand volts and durations of a few tens of nanoseconds, at frequencies up to several hundred hertz, are commonly utilized for firing of gas lasers or in ozone generators.

At the time of application of the charging pulse, the conductive plate 23 will be essentially at ground potential. Because of the relatively large dielectric constant of the dielectric material 20, the exposed dielectric surface 21 adjacent to the grid 26 will initially remain near the potential of the plate 23 (i.e., ground potential) although the grid 26 will be at the voltage applied across the energy storage capacitor 43; this capacitor will charge at a rapid but finite rate because of the inevitable output resistance of the pulse voltage source. At a certain voltage which is much less than the break-down voltage of the main gap between the grid 26 and the electrode surface 38, a discharge will occur between the grid and the dielectric surface 21. This discharge is observed to be very uniform over the dielectric surface 21. Electrons continue to discharge from the grid to the dielectric surface until an amount of negative charge is provided to the surface which is sufficient to bring the potential of the surface up to a value at which the potential difference between grid and surface is not great enough to sustain the discharge. The total charge that must be deposited, and thus the amount of electrical energy devoted to the preionization discharge, can be controlled by adjusting the coupling capacitor 48, since the smaller the capacity of this capacitor, the faster will the capacitor formed by the plate 23 and the grid 26 become fully charged.

The exact nature of the discharges occurring at such high voltages and short pulse durations between the grid and the dielectric surface is not precisely known; however, it is believed that free electrons are accelerated along the dielectric surface and generate additional free electrons in a multiplication process. A useful discharge between the grid conductors and the dielectric surface can result from the acceleration of free electrons either toward or away from the grid conductors—thus allowing the first electrode to be used as either a cathode or an anode.

The resulting concentrated discharges of electrons along the dielectric surface tend to be intense sources of ultraviolet light, thus providing a source of ultraviolet photons which propagate from the exposed squares between the conductors of the grid into the main gap. Ultraviolet photons of sufficient energy will be absorbed by the molecules of gas in the gap to free electrons from the molecules, resulting in a two dimensionally uniform photo preionization of the gas molecules within the gap. It is a particular advantage of this invention that the photoionization in this manner can provide a two-dimensionally uniform preionized gas with a high density of ions in close proximity to the electrode.

The preionization discharge takes place along the leading edge of the voltage pulse applied to the cathode. This voltage pulse is observed to briefly dip, due to the absorption of the preionization discharge energy, and thereafter continues to decrease towards its maximum negative amplitude; in doing so, the capacitors 43 and 44 are progressively charged until the electric field between the grid 26 and the second electrode surface 38 reaches a value such that a breakdown discharge is induced in the main gap. This breakdown occurs in a two dimensionally uniform pattern. After the voltage input pulse is removed from the conductor 40, the energy storage capacitors 43 and 44 discharge to maintain the flow of electrons across the gap from the grid 26 to the second electrode (anode) until the voltage across the gap is such that the discharge can no longer be maintained.

The uniform photo-preionization as just described is an important feature of the invention. However, it has been found that preionization in this manner has additional advantages which contribute to the maintenance of a generalized glow discharge and the avoidance of localized arcing. The additional advantages can be best understood from an explanation of the electrical phenomena occuring in the vicinity of the surface of the dielectric core.

It is apparent that the current in the main gap is due to the motion of electrons moving from the first electrode (cathode) toward the second electrode (anode). The number of electrons in the gap multiplies very rapidly after initiation of the discharge due to the process of Townsend ionization resulting from the high electric field in the gap. As the current in the gap increases, an increasing number of electrons must be provided from the cathode surface in order to sustain the build-up of current in the gap and to maintain the uniformity of this current. If the necessary cathode electrons are not available at the applied electric field intensity or if they are not available in two dimensional uniformity across the cathode surface, then the current distribution in the gap will quickly become non-uniform and result in arcing. The electrode structure of the invention provides a uniform source of readily available electrons in two ways. Firstly, the discharge between the grid and the dielectric surface forms an electron plasma of uniform density on, or near, the dielectric surface. The electrons in this plasma may enter the main gap, multiply in number, and therefore contribute to the uniform distribution and build-up of the current in the main gap. Secondly, the discharge between the grid and the dielectric surface also deposits electrons directly onto the surface. These electrons form a portion of the total charge associated with the "displacement current" required to charge up the capacitor formed between the surface 21 of the dielectric core 20 and the conductive plate 23. As the current increases in the main gap between the cathode and anode, the energy storage capacitors 43 and 44 begin to discharge, and the voltage of the flange 28 and grid 26 thereafter tend toward ground potential. As this occurs, the electrons on the dielectric surface have a greater negative potential than the grid, and these electrons are therefore ejected off of the dielectric surface and into the main gap, thereby contributing to the maintenance of uniform current flow in the gap during the period of time when the cathode to anode potential is tending toward zero.

During short voltage pulses, as just described, the heavy positive ions are left behind in the gap. This concentration of available positive ions further minimizes the likelihood of arcing.

The uniform discharge from the surface of the cathode can be observed visually. Under proper conditions of pressure, voltage, etc., examination of the main discharge reveals that the current flow in the gap near the grid breaks up into a patchwork, or regularly spaced array of squares, with each square corresponding to an opening in the wire grid. It thus appears that the current flow between the anode and cathode does not terminate on the exposed surfaces of the metal grid conductors, but rather the current appears to terminate in the area of the exposed dielectric surface between the grid conductors.

As described above, the amount of energy consumed in the preionization discharge can be controlled by selection of the capacitance value of the coupling capacitor 48. Generally, the smaller the value of the capacitance of this capacitor, the shorter will be the time of the preionization discharge. Too short a discharge time will provide an insufficient generation of ionizing photons to satisfactorily preionize the gap. Conversely, if the preionization discharage is too long, too much of the total energy contained in the input pulse will be consumed in the preionization discharge. In addition, it has been observed that if too much energy is provided to the preionization discharge, a non-uniform arc may develop across the cathode-anode gap.

The device illustrated in the drawings can be practically utilized to fire gas lasers or as an ozone generator. For illustrative purposes, the end housings 18 and 19 may be provided with transparent end windows 51 and 52 through which laser light can be emitted. The structure is also well adapted to use as an ozone generator in that air or oxygen may be introduced from the intake port 12 through a channel 54 into the area of the main discharge gap and then out a exhaust channel 55 to the exhaust port 13. It has been found that greatly improved efficiencies of conversion of oxygen to ozone are obtainable when a uniform glow discharge occurs than where the discharge is a non-uniform spark discharge. Moreover, it has also been found that the gas may be passed through the device at much higher pressures, and therefore higher concentrations, where the preionization provided by the device of the invention is utilized. For example, for oxygen gas ($O_2$) a gas pressure of only a few Torr could be applied to the device where preionization of the gas was not utilized. This was determined by disconnecting the plate 23 from the capacitor 48. However, when the plate was attached through the capacitor 48 to ground, and therefore preionization of the gas within the gap occurred, the pressure of the oxygen gas within the device could be applied up to 220 Torr without arcing. Since the concentration of gas molecules within the device is proportional to the pressure of the gas, it is apparent that the device can process oxygen into ozone at a faster rate without arcing than can present ozone generators which do not provide preionization. It may also be noted that, for use as an ozone generator, the device of the invention can be operated at lower voltages than are generally required to fire gas lasers.

A cross-sectional view of a modified embodiment of the discharge device of the invention is shown generally at 60 in FIG. 5. This device also has a first electrode 61 and a second electrode 62 spaced away therefrom to define a main discharge gap.

The first electrode 61 includes a grid 64 which lies across a portion of the surface of a cylindrical dielectric core 65, and a conductive plate 66 mounted in contact with another portion of the cylindrical surface of the core 65 which is spaced away from and electrically isolated from the grid 64. The grid may be formed in the manner described above for the grid 26; as shown in FIG. 5, in cross-section, the grid comprises a woven mesh of conductive wires which is stretched across the bottom of the dielectric core and is held in place between a conductive metal grid flange 68 and the insulating walls 70 of the enclosure. The plate 66 has a concave bottom surface which fits into intimate contact with a portion of the elongated cylindrical surface of the core 65. The plate 66 is mounted to the underside of an insulating block 72, which forms the top of the enclosure, by a metal connecting screw 73. The insulating block 72, the grid flange 68, and the vertical walls 70 of the enclosure are held firmly together by threaded screws 74.

The second electrode 62 may be formed identically to the second electrode 36 described above—preferably including a flat bottom plate 75 of conductive metal and a raised central portion 76 having a flat top surface 77. The second electrode 62 is firmly attached by threaded screws 78 to the enclosure walls 70, so that the main discharge gap is enclosed from the surrounding atmosphere. The end closures of the device (not shown) may be formed in a manner similar to that described above for the discharge device 10. For the reasons described further below, the device 60 may be provided with insulating material 80 on either side of the raised central portion 76 of the electrode 62, and by placement of a flat sheet of dielectric material 81, such as glass, which covers the surface of the second electrode and provides a capacitive ballast that helps to maintain a more uniform discharge and helps prevent the formation of hot sparks.

Figure 6:
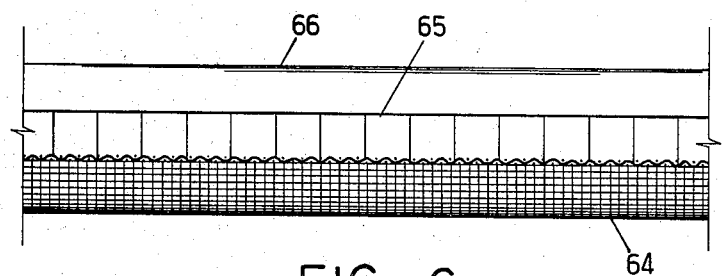
FIG. 6 is an internal view of the first electrode portion of the device of FIG. 5 looking generally along the lines 6—6 of FIG. 5.

A partial sectional view looking at the side of the first electrode is shown in FIG. 6. The core 65 is cylindrical in shape and may be assembled from a plurality of cylindrical slabs, each made of a dielectric such as barium titanate, laid with their flat ends abutting one another to form an elongated cylinder. The conductive metal grid 64 then extends over a portion of the cylindrical surface which is spaced away from and opposed to the portion of the cylindrical surface which is in contact with the conductive plate 66. The imposition of a voltage pulse on the grid 64 (e.g., in the same manner as described above for the device 10) will cause an electrical discharge to occur between the conductors of the grid and the adjacent surface of the dielectric core—which will be maintained near ground potential by the plate 66 acting through the dielectric core. As a result, ultraviolet wavelength photons will uniformly emanate from the cylindrical surface of the core into the gap, with this emission of photons being uniform along the entire length of the first electrode. The result will be a very uniform ionization of the gas within the gap along the entire length of the electrodes so that the ultimate discharge in the main gap between the first and second electrodes will also be substantially uniform over the length of the electrodes. In other respects, the first electrode 61 functions in a manner entirely analogous to the functioning of the electrode structures 15 described above.

The dielectric sheet 81 protects the top surface of the second electrode 62 when it is used as an anode in an ozone generator. The discharge may be explained as follows: when a negative charge is applied to the grid 64, and a discharge takes place from the first electrode across the gap toward the second electrode, the electric field passed through the dielectric material 81 will cause the discharged electrons to accumulate on this surface for a short period of time. If the main discharge is relatively short, the accumulation of electrons on the surface of the dielectric sheet 81 will not substantially interfere with the discharge across the gap. After the discharge from the first electrode to the second electrode has been terminated, a positive voltage pulse may be applied to the grid to cause another substantially uniform discharge from the surface of the dielectric sheet 81 back to the surface of the dielectric core 65. The use of such a dielectric barrier is common in existing ozone generators. The presence of the barrier increases the ozone yield by serving as a capacitive ballast that functions to allow good spatial uniformity of the discharge and to prevent sparks that tend to destroy the ozone already formed in the discharge gap.

Although particular constructions for the device of the invention have been disclosed and described herein, other configurations may be produced without departing from the scope of the invention. For example, the cathode structure may comprise a single unitary dielectric core having opposed flat faces, with a conductive grid mounted on one of the faces and a single conductive plate mounted on the other face. The shape of the cathode thus formed is not limited to any particular geometry. As an example, the device shown in the drawings could be formed as a single elongated dielectric core having a rectangular cross-section with the fine wire mesh grid extending over the length of the face of the core and with a single plate extending over the length and width of the other face of the core. Details of construction of the cathode may be varied in other ways, such as utilizing a flat faced glass core having conductive metal deposited on one side to form the conductive plate, or the core may be formed by providing a flat steel base which serves as the plate and coating the steel with fired porcelain which acts as the core. The conductive grid has been shown as fine conductive wires woven together in a mesh, but the grid may also be formed as a perforated metal sheet, by photo-etching of an array of openings in thin sheets of copper or nickel or other suitable conductor, or by vapor depositing conductive metal in a grid pattern on the dielectric surface.

It is understood that theras come within the scope of the following claims.

We claim:

1. An electrode adapted to provide a uniform area source of ultraviolet wave length photons which are available to ionize the gas adjacent the electrode, comprising:
   (a) a solid core formed of dielectric material having a peripheral surface;
   (b) a grid of electrical conductors mounted on a portion of the peripheral surface of said dielectric core; and
   (c) a conductive plate mounted on a portion of the peripheral surface of said dielectric core which is spaced away and electrically isolated from said grid, the material of which said dielectric core is formed and the thickness of said dielectric core between said grid and said plate being selected such that a potential difference can be applied between said grid and said plate which will initiate an electrical discharge between said grid conductors and the adjacent surface of said dielectric core without electrical breakdown of said core,
   whereby the application of a sufficient voltage potential difference between said plate and grid will cause an electrical discharge between the conductors of said grid and the adjacent surface of said dielectric core, without the need for external heating of the electrode, with a resulting release of ultraviolet wave length photons from the areas of the surface of said core which are between and are left exposed by the conductors of said grid.

2. The electrode of claim 1 wherein said dielectric core is formed of a material selected from the group consisting of glasses and ceramics.

3. The electrode of claim 1 wherein said dielectric core is formed of barium titanate.

4. The electrode of claim 1 including means for applying a voltage potential difference between said plate and said grid sufficient to initiate an electrical discharge between the conductors of said grid and the adjacent surface of said dielectric core to thereby produce ultraviolet frequency photons.

5. The electrode of claim 1 including a coupling capacitor electrically connected from said plate to ground and an energy storage capacitor electrically connected from said grid to ground, whereby a sufficient negative voltage pulse applied to said grid will cause said energy storage capacitor to charge up and eventually reach a voltage at which electrons will be discharged between the conductors of said grid and the adjacent surface of said dielectric core.

6. The electrode of claim 1 wherein said grid comprises a woven mesh of conductive wires.

7. The electrode of claim 1 wherein said core has two opposed surfaces at least one of which is flat and has said grid mounted thereon, said plate being mounted on the other opposed surface.

8. The electrode of claim 1 wherein said core has a cylindrical surface, said grid being mounted on a portion of the cylindrical surface and said plate being mounted on another portion of the cylindrical surface which is opposed to and spaced away from the portion of the surface on which said grid is mounted.

9. An electrical discharge device adapted to provide a uniform glow type discharge, comprising:
 (a) a first electrode adapted to provide a uniform area source of ultraviolet wave length photons, comprising:
  (1) a solid core formed of dielectric material having a peripheral surface;
  (2) a grid of electrical conductors mounted on a portion of the peripheral surface of said dielectric core; and
  (3) a conductive plate mounted on a portion of the peripheral surface of said dielectric core which is spaced away and electrically isolated from said grid, the material of which said dielectric core is formed and the thickness of said dielectric core between said grid and said plate being selected such that a potential difference can be applied between said grid and said plate which will initiate an electrical discharge between said grid conductors and the adjacent surface of said dielectric core without electrical breakdown of said core;
 (b) a second electrode; and
 (c) an enclosure supporting said first and second electrodes in spaced relation with a discharge gap defined between them;
 whereby the application of a sufficient voltage potential difference between said plate and grid of said first electrode will cause an electrical discharge between the conductors of said grid and the adjacent surface of said dielectric core, without the need for external heating of said first electrode, with a resulting release of ultraviolet wave length photons into the discharge gap to yield two dimensionally uniform ionization of a gas in the gap.

10. The device of claim 9 further including a charging circuit having a coupling capacitor electrically connected from said plate on said first electrode to ground, and an energy storage capacitor electrically connected from said grid on said first electrode to ground, said second electrode being electrically connected directly to ground, whereby a negative voltage pulse provided from a voltage generator to said grid will charge up said energy storage capacitor over a finite period of time, and whereby during the charging of said energy storage capacitor, a voltage will be attained such that a discharge will occur between said grid and the adjacent surface of said core.

11. The device of claim 10 wherein said enclosure has interior walls surrounding the discharge gap and further including a housing on each end of said enclosure mounted to seal the interior of said enclosure from the surrounding atmosphere, an input port adapted for the introduction of gas into the interior of said enclosure and an output port for the exhaustion of gas therefrom, whereby ozone may be generated by passing oxygen gas from the input to output ports through the interior of said enclosure while providing negative voltage pulses to said grid of said first electrode.

12. The device of claim 10 including a plurality of identical first electrodes supported by said enclosure in spaced relation to said second electrode, said dielectric core of each first electrode being cylindrical with opposed flat surfaces, said plate of each first electrode comprising a metal plate mounted to one of the surfaces of each core, and said grid of each first electrode comprising a conductive wire mesh mounted on the surface of each core facing said second electrode, and wherein said grids are electrically connected in parallel to said energy storage capacitor and said plates are electrically connected in parallel to said coupling capacitor.

13. The device of claim 9 wherein said dielectric core is formed of a material selected from the group consisting of glasses and ceramics.

14. The device of claim 9 wherein said grid comprises a woven mesh of conductive wires.

15. The device of claim 9 wherein said dielectric core is formed of barium titanate.

16. The device of claim 9 wherein said core has two opposed surfaces at least one of which is flat and has said grid mounted thereon, said plate being mounted on the other opposed surface.

17. The device of claim 9 wherein said core has a cylindrical surface, said grid being mounted on a portion of the cylindrical surface, and said plate being mounted on another portion of the cylindrical surface which is opposed to and spaced away from the portion of the surface on which said grid is mounted.

18. The device of claim 9 including a dielectic barrier sheet mounted over said second electrode.

* * * * *

UNITED STATES PATENT AND TRADEMARK OFFICE
CERTIFICATE OF CORRECTION

PATENT NO. : 4,317,067
DATED : February 23, 1982
INVENTOR(S) : William A. Fitzsimmons, Louis A. Rosocha It is certified that error appears in the above-identified patent and that said Letters Patent are hereby corrected as shown below:

Col. 10, line 12, "It is understood that theras come within the scope of the following claims." should read --It is understood that the invention is not confined to the particular construction and arrangement of parts herein illustrated and described, but embraces all such modified forms thereof as come within the scope of the following claims.--

Signed and Sealed this

Third Day of August 1982

[SEAL]

Attest:

GERALD J. MOSSINGHOFF

Attesting Officer    Commissioner of Patents and Trademarks